United States Patent [19]

Orrison

[11] 4,341,176
[45] Jul. 27, 1982

[54] AIR FOIL WITH REVERSIBLE CAMBER

[76] Inventor: William W. Orrison, 900 NE. Loop 410, Suite E-103, San Antonio, Tex. 78209

[21] Appl. No.: 191,938

[22] Filed: Sep. 29, 1980

[51] Int. Cl.³ .......................... B63H 9/04; B64C 3/48; F03D 9/00

[52] U.S. Cl. ...................... 114/102; 114/127; 244/219; 244/123; 416/119; 416/132 B; 416/DIG. 5; 290/55

[58] Field of Search ............... 244/198, 123, 219, 201, 244/35 R; 416/DIG. 5, 119, 132 B; 114/39, 102, 103, 126, 127, 162, 144, 142, 143, 275, 280; 290/43, 44, 54, 55

[56] References Cited

U.S. PATENT DOCUMENTS

| | | | |
|---|---|---|---|
| 1,430,406 | 9/1922 | Schulthes et al. | 416/DIG. 5 |
| 1,790,309 | 1/1931 | Kientz | 244/219 |
| 2,077,685 | 4/1937 | Gerhardt | 114/103 |
| 3,381,647 | 5/1968 | Keder | 114/102 |
| 3,753,415 | 8/1973 | Burtis | 114/127 |
| 4,064,821 | 12/1977 | Roberts et al. | 114/103 |
| 4,247,251 | 1/1981 | Wuenscher | 416/119 |
| 4,280,433 | 7/1981 | Haddock | 114/127 |

FOREIGN PATENT DOCUMENTS

| | | | |
|---|---|---|---|
| 536494 | 3/1922 | France | 244/219 |
| 757191 | 12/1933 | France | 244/219 |
| 2290585 | 6/1976 | France | 416/DIG. 5 |
| 2431425 | 2/1980 | France | 114/103 |

*Primary Examiner*—Galen L. Barefoot
*Attorney, Agent, or Firm*—Gunn, Lee & Jackson

[57] ABSTRACT

A reversible airfoil generally wing-like in shape comprising at least two spaced apart rigid spars having at least two slots therethrough, bars projecting through the slots in each rigid spar, each end of each bar attaching to a flexible slat, and a common flexible movable skin adjacent the flexible slats thereby covering same to form a reversible airfoil. A series of the rigid spars and attending parts when covered by a common flexible skin and adapted to fit on a beam provides a unique sail for a sailboat. Additionally, a series of the rigid spars and attending components when covered by a common flexible skin and vertically mounted on a rotatable frame provides a reversible lift airfoil for a wind-powered generator.

15 Claims, 12 Drawing Figures

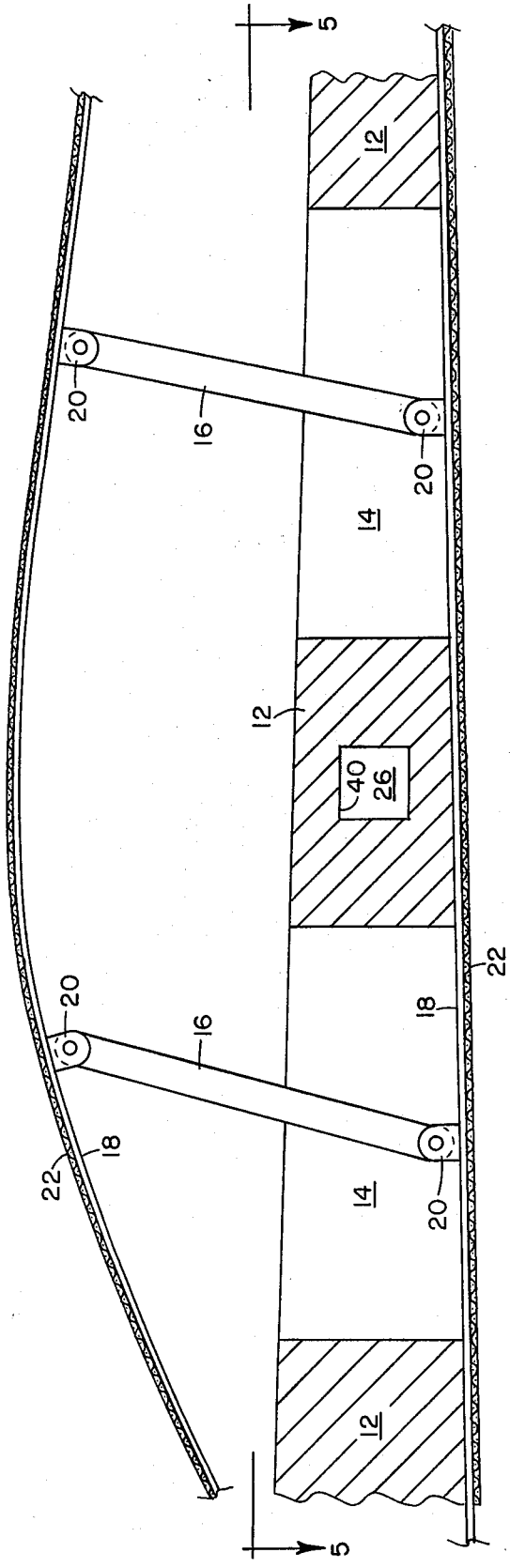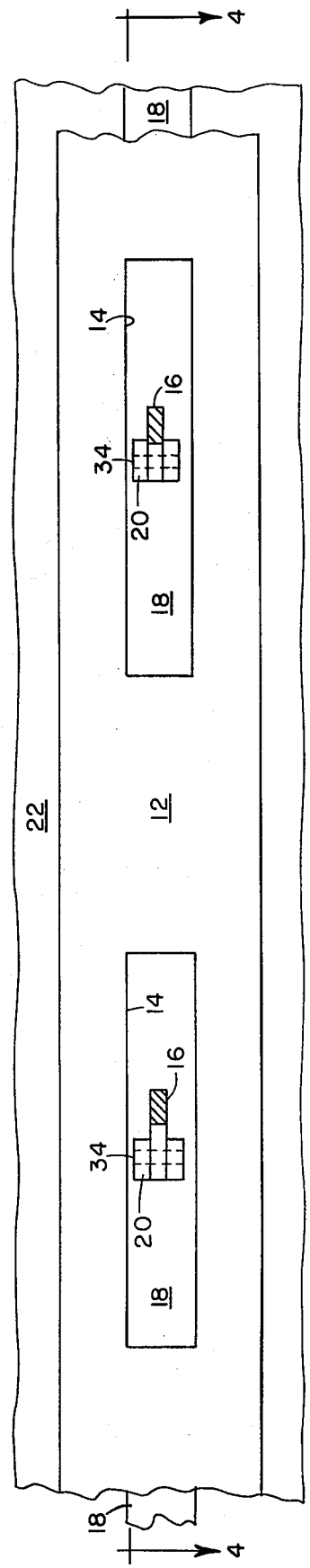

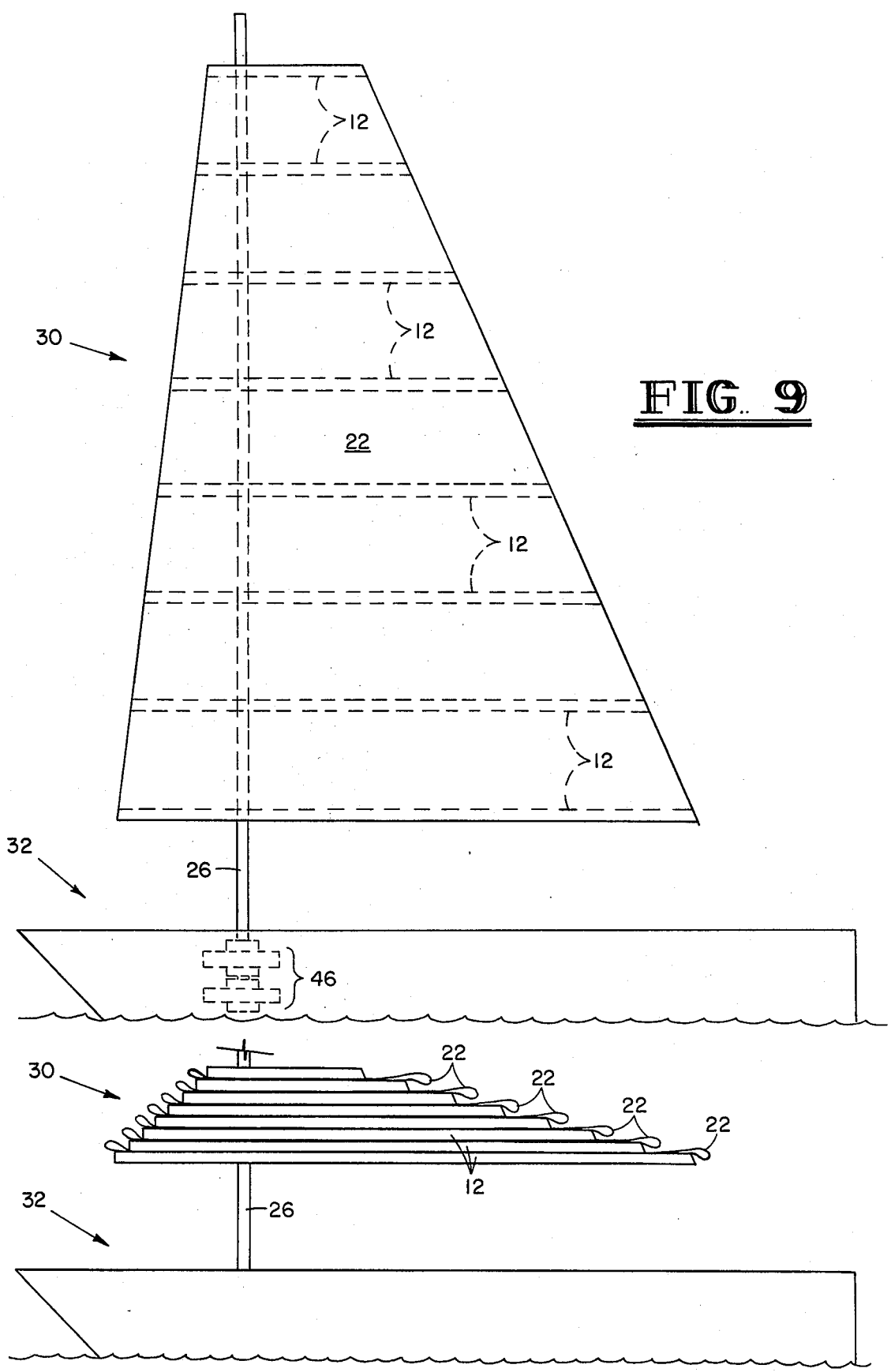

AIR FOIL WITH REVERSIBLE CAMBER

BACKGROUND OF THE INVENTION

By the unique design of the present invention, a reversible airfoil is realized. Lift can be accomplished on either side of the invention aircraft wing-type airfoil by an arrangement of bars movable through spaces in a rigid spar, each end of the bars connecting to a flexible slat that is covered by a flexible, movable skin. Joining several sets of the rigid spars and attending components will form an airfoil of sufficient size to be utilized as a sail on a sailboat. When a plurality of the invention airfoils are scaled accordingly and mounted vertically on a rigid stationary frame, a power generator can be obtained.

BRIEF DESCRIPTION OF THE PRIOR ART

A visit to a local airport will produce numerous examples of airfoils. The wings of aircraft are airfoils having a single direction of lift, upward. By their very construction, aircraft wings are designed to only lift upward. Air flowing over the top of the wing creates a vacuum. The wing attempts to fill that vacuum by moving upward thereby creating lift. Airplane wings, however, are extremely rigid in construction with all the component parts being essentially inflexible.

The airfoil of the present invention is designed to provide lift which is automatically reversed by changing the angle of incidence of the wind upon the airfoil, resulting in lift in the opposite direction. This is accomplished by a unique arrangement of movable bars, rigid spars, flexible slats, and a flexible, movable skin, the entire airfoil having a generally aircraft-wing configuration.

The invention airfoil may be used as a sail for a sailboat if a plurality of the airfoils are connected. Also, the invention may function when mounted vertically in series on a rigid frame to provide a wind powered generator.

SUMMARY OF THE INVENTION

It is an object of the present invention to provide a reversible airfoil having at least two sets comprising two rigid spars having bars movable in slots therein, each end of the bars connecting to flexible slats, which in turn are covered by a flexible movable skin. The reversible airfoil has a configuration similar to an aircraft wing.

It is a further object of the present invention to provide a sail for a sailboat, the sail comprising a plurality of airfoils joined by a common movable, flexible skin.

It is yet a further object of the present invention to provide a reversible airfoil for a power generator rotating on a vertical axis with two or more rigid frames with the airfoils mounted vertically between the rigid frames, the rotation of which by the wind generates power. The angle of incidence with the wind is automatically controlled by the propeller and wind vane mounted on the top of the power generator.

BRIEF DESCRIPTION OF THE DRAWINGS

FIG. 4 is an enlargement of section A of FIG. 1.

FIG. 5 is a cross-sectional view of the invention along line 5—5 of FIG. 4.

FIG. 9 is a pictorial illustration of the invention airfoil utilized as a sail on a sailboat, the sail unfurled.

FIG. 10 is a pictorial illustration of the sailboat depicted in FIG. 10 with the sail furled.

DESCRIPTION OF THE PREFERRED EMBODIMENT

The basic components of the invention airfoil will be described in reference to FIGS. 1–10. Although the airfoil as illustrated in these figures is utilized as a sail for a sailboat, this is but one embodiment of the invention airfoil and should not be limited to the embodiment illustrated.

Figure 1:
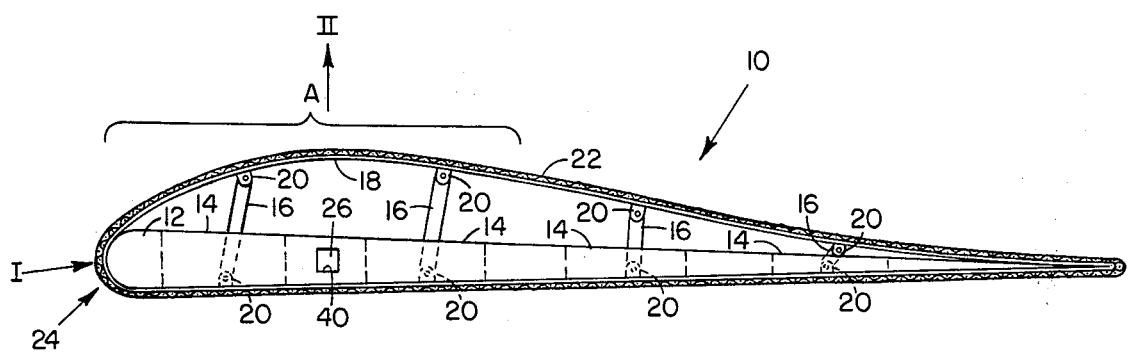
FIG. 1 is a lengthwise sectional view of the invention airfoil showing lift in a particular direction.
Figure 2:
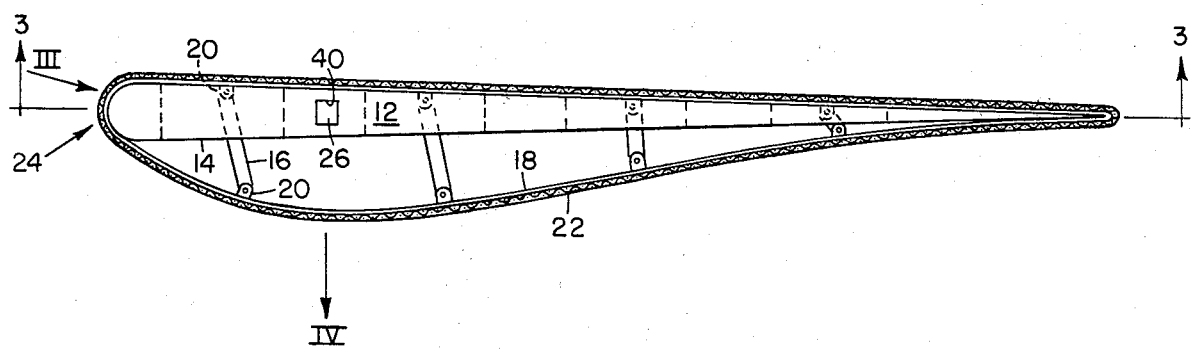
FIG. 2 is a lengthwise sectional view of the invention airfoil of FIG. 1 showing lift in a different direction.

Lengthwise cross-sectional views of the invention airfoil 10 are shown in FIGS. 1 and 2. The wing-like airfoil 10 comprises a rigid spar 12, which has periodically spaced along its length a series of slots 14 of sufficient size to receive bars 16. Slots 14 extends completely through rigid spar 12 to allow bars 16 to project therethrough and connect on each end to flexible slat 18 by means of hinge 20. Covering flexible slat 18 is flexible, movable skin 22. Skin 22 may be attached by any conventional means to flexible slat 18 as long as skin 22 is allowed to flex and be capable of moving to some degree around the anterior end 24 of airfoil 10.

Located forward of the center of airfoil 10 is beam 26 which provides the means of attaching a series of airfoils 10, otherwise known in this specification as a sail, to a sailboat or to the frame of a power generator. These aspects will be discussed in detail in the description of FIGS. 6, 7, 11, and 12.

As illustrated in FIG. 1, wind is contacting airfoil 10 from the direction indicated by arrow I. This results inflexible slat 18 and skin 22 being drawn against one side of rigid spar 12 and the opposite being pulled upward in the direction indicated by arrow II thereby lifting airfoil 10 in the direction of arrow II.

When the wind shifts to the direction as shown by arrow III in FIG. 2, skin 22 moves slightly around the anterior end 24 of airfoil 10 and flexible slat 18, previously against rigid spar 12 as shown in FIG. 1, is pulled outward in the direction indicated by arrow IV. Lift is now in the direction of arrow IV. Thus, the invention reversible airfoil 10 provides lift in one direction or in the opposite direction, depending upon the angle of incidence of the wind.

When shifting from the position as shown in FIG. 1 to the position in FIG. 2, bars 16 connected to flexible slat 18 by hinges 20 slide freely through slots 14 in rigid spar 12. Likewise, during the shifting process, flexible slat 18 and skin 22 attached thereto are allowed to flex slightly and slide slightly around the anterior end 24 of airfoil 10. This flexibility is essential to enable the invention airfoil 10 to have the capability of being reversible in contrast to an aircraft wing which is rigid in all respects and has very little flexibility.

Figure 3:
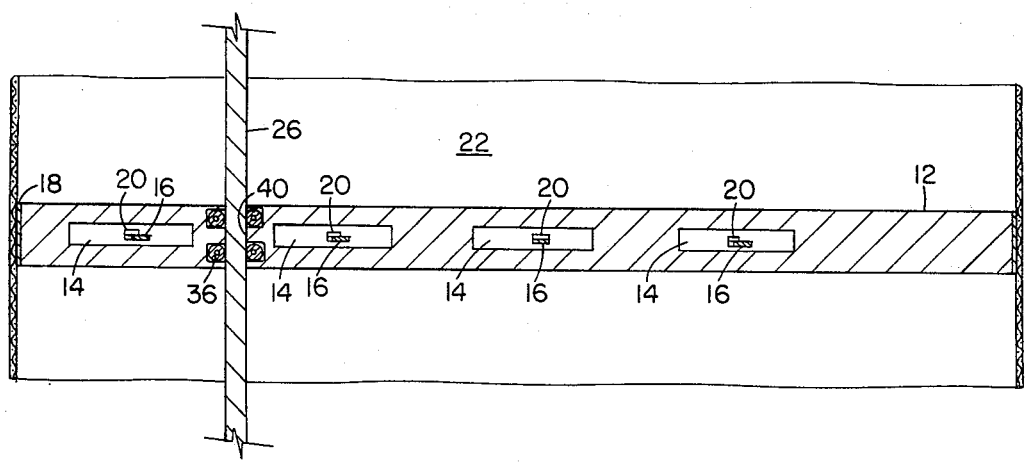
FIG. 3 is a cross-sectional view of the invention airfoil taken along line 3—3 of FIG. 1.

Slots 14 and their relationship to the other components of airfoil 10 are shown in detail in FIG. 3. In FIG. 3, a single rigid spar 12, one of a series of spars, is shown, the series of spars being connected by a common skin 22 to form a sail for a sailboat as shown in FIGS. 9 and 10. Beam 26 as shown is perpendicular to rigid spar 12. Attached to beam 26 by conventional means are rollers 28 which allow the sail 30 on sailboat 32 to be raised and lowered on beam 26 by a system of ropes and pulleys commonly used on sailboats equipped with a conventional-type of sail.

A section of the invention airfoil 10 denoted by "A" in FIG. 1 is shown in detail in FIG. 4. As more clearly seen, bars 16 slide freely through substantial slots 14 in rigid spar 12 and connect on each end by means of hinges 20 to flexible slat 18. The pivotal capability of bars 16 on hinges 20 is necessary to allow bars 16 to move back and forth through slot 14 and enable the invention airfoil to have reversible lifting capabilities. The pivotal action also permits flexible slat 18 connected to bars 16 by hinges 20 to move slightly when necessary during the reversing process as previously described.

An even more detailed view of slots 14 and bars 16 which project therethrough is shown in FIG. 5. Taken along line 5—5 of FIG. 4, FIG. 5 shows bars 16 projecting through slots 14 in rigid spar 12. Bars 16 are connected to flexible slat 18 via hinge 20. A pin 34 connects bar 16 to hinge 20 and allows bar 16 to pivot.

Figure 6:
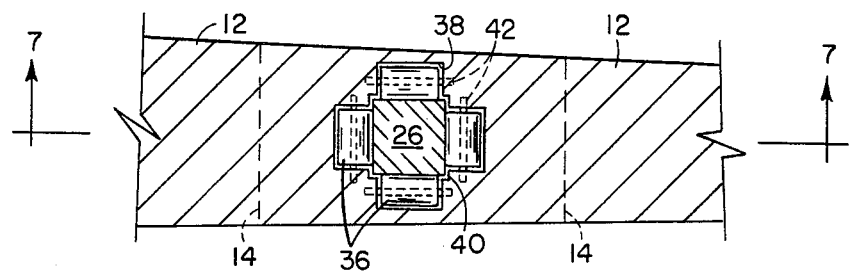
FIG. 6 is a cross-sectional view of the beam area of the invention taken along line 6—6 of FIG. 7.
Figure 7:
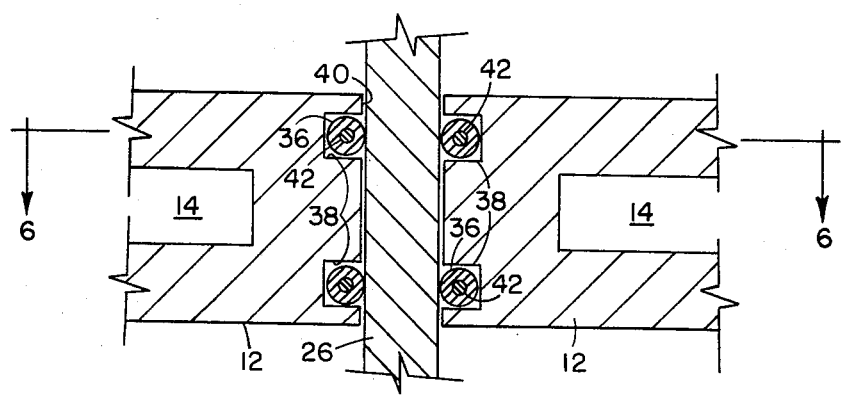
FIG. 7 is a side view of the beam area of the invention taken along line 7—7 of FIG. 6.

When a series of the invention airfoil 10 are joined by a common skin 22 to form a sail for a sailboat, beam 26 functions as a mast. To raise and lower sail 30 on beam 26 as depicted in FIGS. 9 and 10, rollers 36 are secured to rigid spar 12 and allowed to contact beam 26. These rollers 36 and their relation to beam 26 are shown in detail in FIGS. 6 and 7. Notches 38 are formed in rigid spar 12 adjacent opening 40 for beam 26. Rollers 36 are secured in these notches 38 by pins 42. Notches 38 are sufficiently sized to allow rollers 36 to rotate freely on pins 42 yet at the same time make contact with beam 26. FIGS. 6 and 7 clearly show rollers 36 secured in notches 38 of rigid spar 12 via pins 42, rollers 36 contacting beam 26. Beam 26 is shown as square in shape, the preferred configuration. However, beam 26 may also be rectangular in shape.

Figure 8:
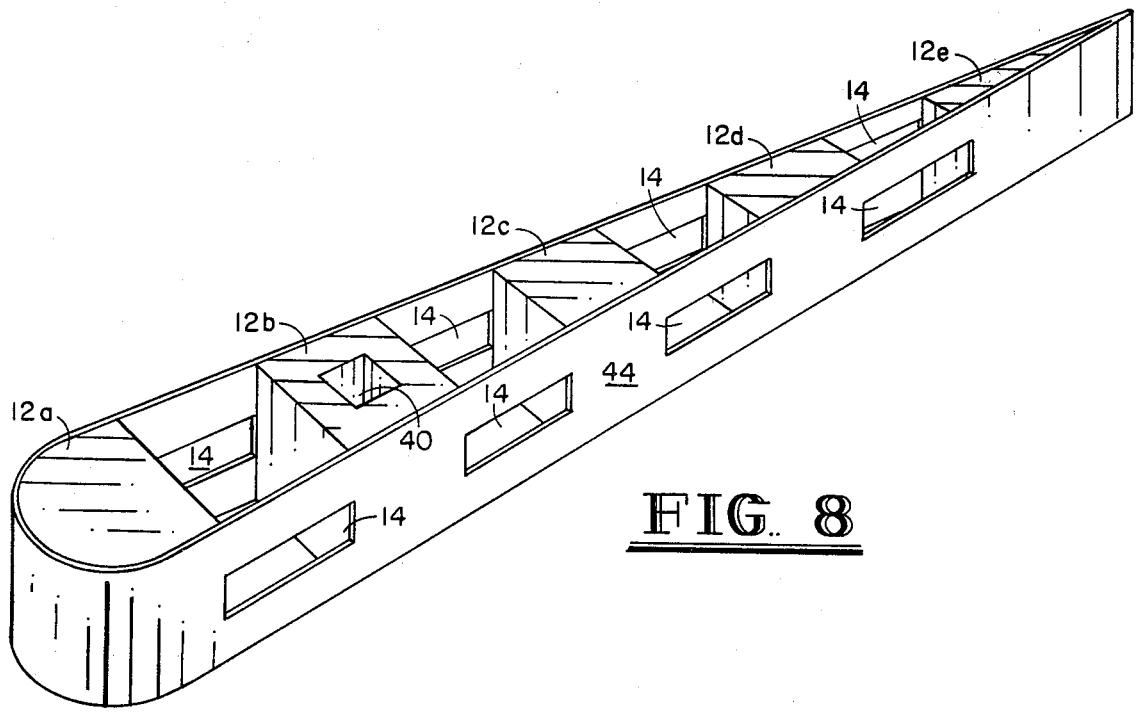
FIG. 8 is a perspective view of an alternative embodiment of the invention airfoil.

The rigid spars 12 of the invention reversible airfoil 10 are, as the name implies, made of rigid material, such as wood or aluminum. The rigid spar 12 may be a solid piece of material tapered and shaped to have a forward end and sides tapered to a point at the trailing end. Slots 14 and opening 40 for beam 26 may subsequently but cut of the solid spar. An alternative spar may be fabricated as illustrated in FIG. 8. Sheath 44 of a predetermined width having slots 14 previously formed therein is attached by known means such as nailing, screwing, or glueing to rigid spar components 12a, 12b, 12c, 12d, and 12e. As shown in FIG. 8, five components make up the rigid spar. However, this alternative embodiment is not limited to the illustrated example. A spar having less than or more than five components is also contemplated. The five rigid spar components 12a–12e are shaped accordingly so when secured to sheath 44 and spaced apart by slots 14, they form a wing-like configuration. The component positioned centrally in sheath 44 (component 12b in FIG. 8) must have an opening 40 to accommodate beam 26. Either type of rigid spar is suitable in the invention, one formed by a solid piece of material appropriately cut out or a sheath having slots cut therein secured to a plurality of rigid spar components. In either embodiment, the rigid spar will have the same overall configuration.

One utility of the invention reversible airfoil is pictorially illustrated in FIGS. 9 and 10. A series of invention airfoils have been joined by a common flexible movable skin to form a sail 30 for a sailboat 32. Rigid spars 12 are shown equally spaced apart. Beam 26 forming the mast of sailboat 32 is connected inside the sailboat to a gear/support mechanism 46 and projects upward slightly past the uppermost edge of sail 30. Rigid spars 12 have previously had their ends preformed so when sail 30 is fully erected, it has the conventional sail profile.

Unfurled, as shown in FIG. 10, sail 30 utilizing the invention reversible airfoil collapses into a compact form with rigid spars 12 stacking on top of one another and the excess skin 22 protruding outward from between the stacked rigid spars 12.

Although not shown in FIGS. 9 and 10, sail 30 is raised and lowered on beam 26 by the means commonly and conventionally used on sailboats, a system of ropes and pulleys. Rollers 28 previously discussed in reference to FIGS. 6 and 7 facilitate the raising and lowering of sail 30.

Figure 12:
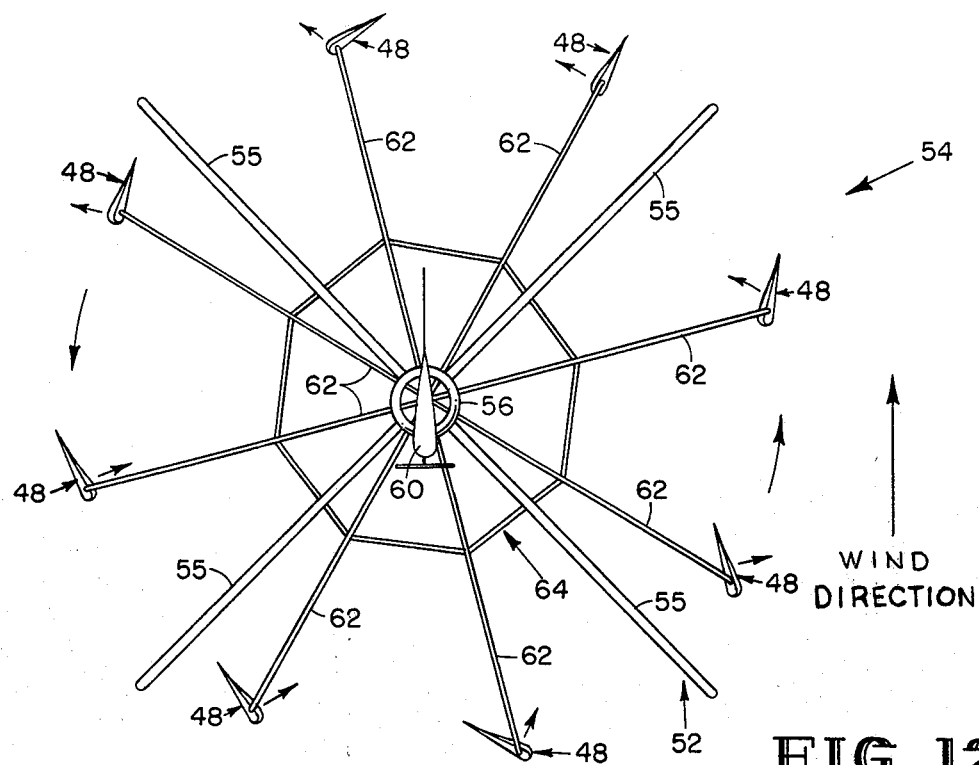
FIG. 12 is a top view of the power generator of FIG. 11.
Figure 11:
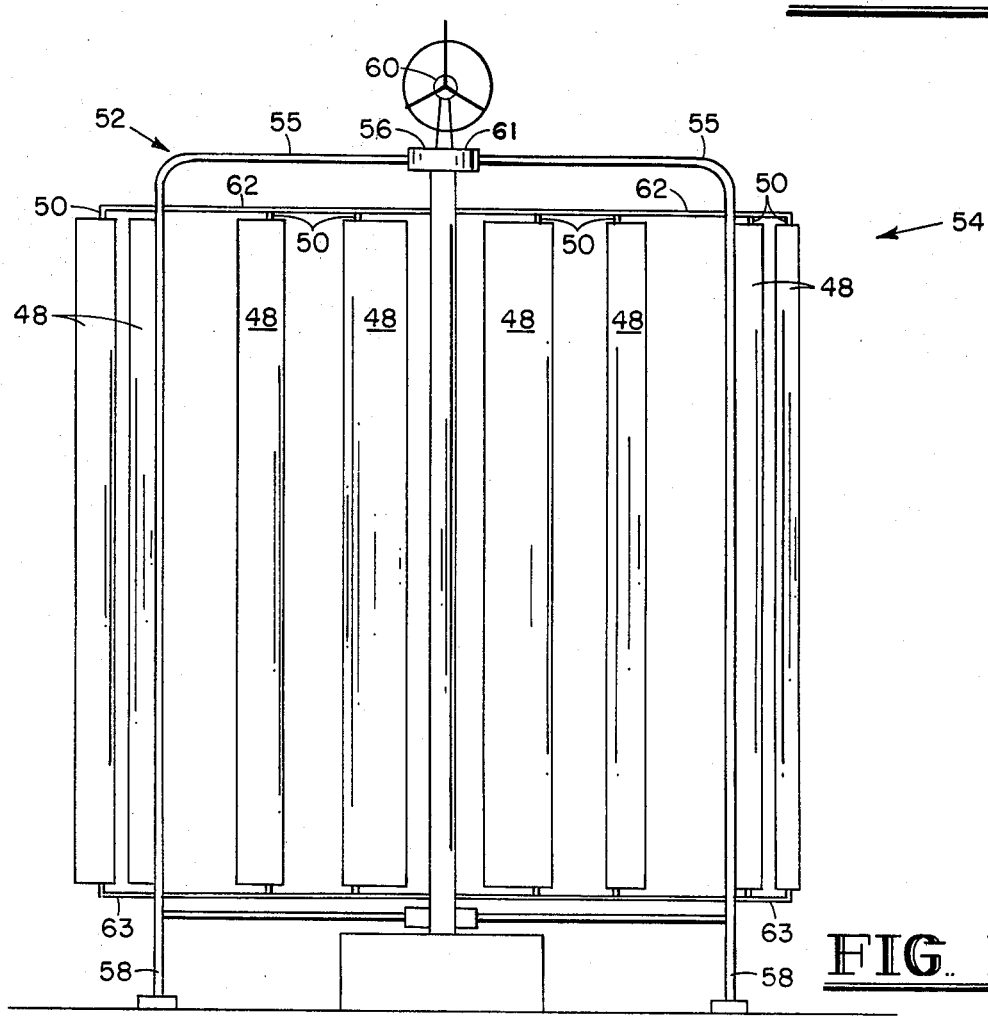
FIG. 11 is a side view of a power generator rotating on a vertical axis.

Another utility for the invention reversible airfoil is shown in FIGS. 11 and 12. A series of airfoils are joined again by a common flexible, movable skin to form panels 48. Each panel 48 is mounted vertically on individual rods 50 which are an integral part of frame 52, the entire assemblage forming a wind-powered generator 54. As illustrated, frame 52 comprises four supports 55 at right angles to each other and joined at a central point 56. The lower end of each support 55 provides the legs 58 for the generator 54. Radiating outward from central pivot point 61, are upper arms 62 and lower arms 63 on an outermost end of which and joining same are rods 50. Arms 62 and 63 are evenly spaced from each other and held in a rigid position by auxiliary supports 64 that when joined from an octagon. Joining arms 62 and arms 63 with auxiliary supports 64 two octagon shapes are formed, one near the top of generator 54 and one near the bottom of generator 54 in close proximity to legs 58.

Rod 50 extends the length of each panel 48 in the same manner as beam 26 does in sail 30. As shown by the arrows in FIG. 12, wind from the direction of the large arrow impacts on panels 48 and causes each invention airfoil panel to lift in the direction indicated by the small arrows, the angle of incidence of the vertical airfoils with the wind being controlled by the air speed and wind direction devices 60 mounted at the top of generator 54. By this lifting action, panels 48 force arms 62 to rotate on central pivot point 61 thereby generating power. The generator 54 may be connected by conventional means to provide power to operate any number of devices.

Although the materials suitable for each part of the invention reversible airfoil are self-evident from the names of the parts of the invention, specific materials might be mentioned for clarification. Rigid spar 12 may be made of any sturdy, rigid material such as wood, metal, or plastic. Where weight is of importance such as in the sail for a sailboat, aluminum or plastic would be preferred. Flexible slat 18 may be any semi-flexible material such as aluminum or plastic. Again, the choice of materials depends upon the ultimate use of the airfoil.

Bars 16 and hinges 20 must be of a material capable of withstanding pressure, preferably a rigid inflexible material. Skin 22 may be any flexible material such as cloth, thin metal, or Mylar as long as the material will allow the flexing and movement necessary for the skin to perform as discussed.

While the invention has been described in connection with the preferred embodiment, it is not intended to limit the invention to the particular forms set forth, but, on the contrary, it is intended to cover such alternatives, modifications, and equivalents as may be included within the spirit and scope of the invention as defined by the appended claims.

I claim:

1. A reversible airfoil having a tapered and shaped configuration comprising:
   at least two spaced apart rigid spars having in each of said rigid spars,
   at least two slots therein, said slots of sufficient size to permit bars to project therethrough, each end of said bar attaching to,
   flexible slats parallel to said rigid spars, and
   a flexible movable skin covering the outer surfaces of said flexible slats, said bars moving in and through said slots in said rigid spars to allow said flexible slats and said skin to move in relation to said rigid spars in response to wind impacting said airfoil and thereby creating a lifting action in said airfoil.

2. The airfoil of claim 1 wherein said bars are attached to said flexible slats by hinges and pins to permit said bars to pivot.

3. The airfoil of claim 2 wherein said rigid spars are solid pieces of material having slots formed therein.

4. The airfoil of claim 2 wherein each of said rigid spars comprises a plurality of spar components preshaped to form a tapered spar rounded at the leading end and tapered to a point at the trailing end when held together by a sheath having said slots to receive said bars therein, said spar components being spaced apart in said sheath by the same distance as said slots in said sheath.

5. The airfoil of claim 1 having an opening in the forward area of said rigid spars to permit a beam to project through and perpendicular to said rigid spars to provide a means for mounting said airfoil.

6. A sail for a sailboat comprising:
   a plurality of spaced apart rigid spars having a plurality of slots therein of sufficient size to permit,
   bars to project therethrough and attach to,
   a plurality of spaced apart flexible slats parallel to said rigid spars,
   a flexible, movable skin covering the outer surfaces of said flexible slats and joining same,
   a beam projecting through an opening in a forward area of each of said rigid spars, said beam functioning as a mast for said sailboat, and
   a system of ropes and pulleys attached to said sail and said beam to raise and lower said sail,
   said bars moving in and through said slots in said rigid spars to allow said flexible slats and said skin to move in relation to said rigid spars in response to wind impacting said sail and thereby creating a lifting action in said sail.

7. The sail of claim 6 wherein said bars are attached to said flexible slats by hinges and pins to permit said bars to pivot.

8. The sail of claim 7 wherein rollers are mounted in said rigid spars adjacent said opening for said beam, said rollers facilitating the raising and lowering of said sail on said beam.

9. The sail of claim 7 wherein said rigid spars are solid pieces of material having slots formed therein.

10. The sail of claim 7 wherein each of said rigid spars comprises a plurality of spar components preshaped to form a tapered spar rounded at the leading end and tapered to a point at the trailing end when held together by a sheath having said slots to receive said bars therein, said spar components being spaced apart in said sheath by the same distance as said slots in said sheath.

11. A wind-powered generator comprising a plurality of vertically mounted panels secured to a frame and capable of rotating in response to the force of wind impacting thereon, said vertically mounted panels comprising:
    a plurality of spaced apart rigid spars having a plurality of slots therein of sufficient size to permit,
    bars to project therethrough and attach to,
    a plurality of spaced apart flexible slats parallel to said rigid spars, and
    a flexible, movable skin covering the outer surfaces of said flexible slats and joining same,
    said bars moving in and through said slots in said rigid spars to allow said flexible slats and said skin to move in relation to said rigid spar in response to wind impacting said panels and thereby creating a lifting action in said panel resulting in said panels rotating and generating power to a device connected to said wind-powered generator.

12. The wind-powered generator of claim 11 wherein said bars are attached to said flexible slats by hinges and pins to permit said bars to pivot.

13. The wind-powered generator of claim 12 wherein said panels are secured to said frame by a rod extending the vertical length of each of said panel through an opening in the forward area of each of said rigid spars, and said rods are joined together by supports to a central pivot point.

14. The wind-powered generator of claim 12 wherein said rigid spars are solid pieces of material having slots formed therein.

15. The wind-powered generator of claim 12 wherein each of said rigid spars comprises a plurality of spar components preshaped to form a tapered spar rounded at the leading end and tapered to a point at the trailing end when held together by a sheath having said slots to receive said bars therein, said spar components being spaced apart in said sheath by the same distance as said slots in said sheath.

* * * * *